(No Model.)
F. KNOBEL & J. BONTLY.
MILK HEATING DEVICE.
No. 555,515.                          Patented Mar. 3, 1896.
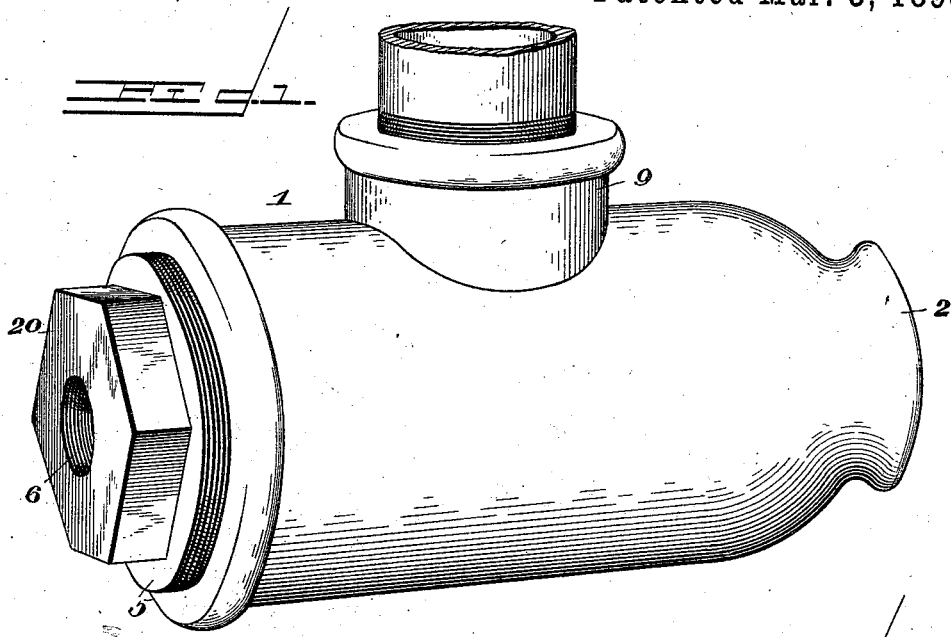
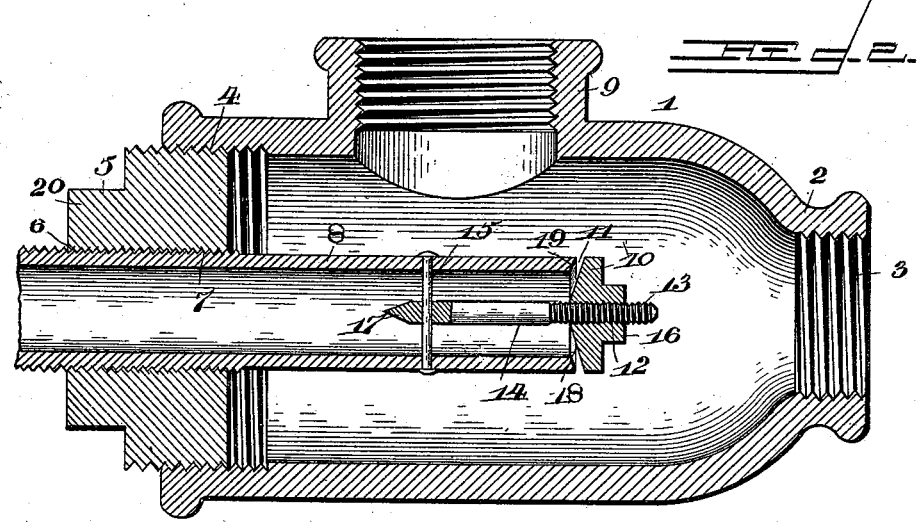
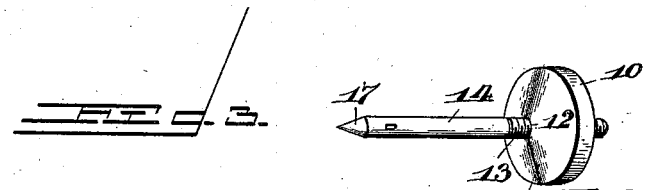
Witnesses                                Inventors,
H. A. Doyle.                      Frederick Knobel,
V. B. Hillyard.       By their Attorneys,   John Bontly.
C. A. Snow & Co.

UNITED STATES PATENT OFFICE.

FREDERICK KNOBEL AND JOHN BONTLY, OF MONTICELLO, WISCONSIN.

MILK-HEATING DEVICE.

SPECIFICATION forming part of Letters Patent No. 555,515, dated March 3, 1896.

Application filed May 4, 1895. Serial No. 548,144. (No model.)

*To all whom it may concern:*

Be it known that we, FREDERICK KNOBEL and JOHN BONTLY, citizens of the United States, residing at Monticello, in the county of Green and State of Wisconsin, have invented a new and useful Milk-Heating Device, of which the following is a specification.

This invention aims to provide an improved milk-heater for treating milk prior to the introduction thereof into a separator in order that the milk may be at the required temperature to insure the proper separation of the butter therefrom.

The object of the present invention is the provision of a simple, inexpensive, and effective device for the purpose aforesaid adapted for attachment to a pipe communicating with the separator, and which is readily accessible for repairs, cleaning, and any other required purpose, and which will subject the milk to a sheet or continuous annular spray of steam which is capable of being varied as to quantity and position to meet various conditions and requirements, and, lastly, to provide a heater of compact form and which will comprise a minimum number of parts and which will attain the desired result in a thorough and satisfactory manner.

Further objects and advantages of the invention will appear in the following description, and the novel features thereof will be more particularly designated in the subjoined claims and illustrated in the accompanying drawings, in which—

Figure 1 is a perspective view of a milk-heater of the present invention. Fig. 2 is a longitudinal section thereof. Fig. 3 is a detail view of the cap and stem provided at the delivery end of the steam-pipe.

Similar numerals designate corresponding parts in the several figures of the drawings.

The body 1 of the heater may have any desired form, and is preferably cylindrical, and has its delivery end 2 tapering and internally threaded at 3 for the attachment therewith of the pipe by means of which the device is connected to the separator. The opposite end is internally threaded, as shown at 4, to receive a plug 5 which is screwed therein, said plug having a centrally-disposed opening 6, which is internally threaded, and receives a corresponding threaded portion 7 of the steam-pipe 8, by means of which the heating media, or steam, is supplied to the interior of the body 1. A collar 9 is formed on a side of the body about midway of its ends, and is designed to have the milk-supply pipe connected therewith, and this collar is internally threaded to make a firm joint with said pipe in the proper positioning of the heater.

The steam-pipe 8 extends within the body 1, and its inner end is fitted with a cap 10, between which and the edge of the said steam-pipe is formed a space 11 for the escape of the steam or heating media in the successful operation of the device, and this cap 10 is provided with a central opening 12, which is internally threaded to receive a corresponding threaded portion 13 of a stem 14 held within the pipe 8 by means of a transversely-disposed pin 15. By this means the cap 10 can be relatively adjusted so as to vary the width of the annular escape or passage 11. The cap 10 is adapted to be turned upon the threaded portion of the stem 14 in any desired manner, and is formed on its outer side with an angular enlargement 16, by means of which a key, tool, or instrument can be fitted thereon for the purpose of turning the cap to obtain the required size of annular escape 11, as will be readily understood.

In order that as little resistance as possible may be offered to the free passage of the steam or heating media through the pipe 8, the stem 14 is slender and its inner end is pointed or tapering, as shown at 17, and to secure and direct the steam outward through the annular escape 11 the inner side of the cap 10 is convexed or made conical, as shown at 18, and the edge of the pipe 8 opposite the conical or convex side of the cap is beveled inward, as shown at 19, whereby the escape or passage 11 has substantially parallel walls.

The steam-pipe 8 is imperforated throughout its length and is adjustable within the body 1 by means of the threaded connection between it and the plug 5. Hence the relative position of the annular escape 11 can be varied as required to meet certain conditions. Thus the said escape 11 can be brought more or less directly opposite the milk-inlet or collar 9, as will be readily understood.

Access is readily had to the interior of the body 1 by removing the plug 5, which latter can be accomplished in any approved manner, and for this purpose the said plug is provided on its outer side with an angular enlargement 20, to which may be fitted a wrench or like tool for the purpose of turning the plug, whereby the desired result can be attained. The annular escape 11 provides for an equal distribution of the steam or heating media to the body of the milk passing through the device, whereby the same is evenly and uniformly heated, and by regulating the size of the said annular escape the steam or heating media will pass therethrough in a gentle manner and warm the milk to the required temperature without disintegrating or breaking the grains of butter, which in practice is objectionable.

In addition to the advantages resulting from the longitudinal adjustment of the steam-pipe 8, the relative adjustment of the cap 10, and the removability of these parts, together with the plug 5, from the body of the heater, other objects are apparent, and it will be understood that in the embodiment of the invention for various purposes changes in the form, proportion, and minor details of construction may be resorted to without departing from the principle or sacrificing any of the advantages of this invention.

Having thus described the invention, what is claimed as new is—

1. A device for treating milk prior to its separation, consisting of a cylindrical body having a milk-inlet in its side about midway of its ends, and having a milk-outlet at one end, a centrally-disposed imperforate pipe extending within the body for supplying a heating medium thereto and supported in the opposite end thereof, and having its inner end terminating just beyond the milk-inlet, and having its edge inwardly beveled, a stem secured within the inner end of the said pipe and having its inner extremity pointed and its outer portion threaded, a cap mounted upon the threaded portion of the stem and having its inner side convexed, and means for turning the said cap upon the threaded portion of the stem to vary the space between its inner side and the beveled edge of the pipe, substantially as set forth for the purpose described.

2. The herein-specified milk-heater, comprising a cylindrical body having one end reduced and internally threaded, and having the opposite end internally threaded, and having an offstanding collar midway of its ends forming a milk-inlet, a plug removably inserted in the larger end of the body and having a centrally-disposed threaded opening, a centrally-disposed imperforate steam-pipe exteriorly threaded and adjustably mounted in the threaded opening of the plug, and having its inner end open and beveled inwardly and terminating just beyond the milk-inlet, a stem centrally secured within the open end of the pipe and having its projecting end threaded, and a cap adjustably mounted upon the threaded end of the stem and convexed on its inner face and forming an annular space with the inner end of the aforesaid pipe, substantially as described for the purpose set forth.

In testimony that we claim the foregoing as our own we have hereto affixed our signatures in the presence of two witnesses.

FREDERICK KNOBEL.
JOHN BONTLY.

Witnesses:
F. GERBER,
J. H. FRAGNER.